I. E. KNOWLTON.
CANE STRIPPER.
APPLICATION FILED MAR. 26, 1918.

1,360,765.

Patented Nov. 30, 1920.

Inventor
Ida E. Knowlton,

By E. Hume Talbert
Attorney

UNITED STATES PATENT OFFICE.

IDA E. KNOWLTON, OF MEDINA, TEXAS.

CANE-STRIPPER.

1,360,765.

Specification of Letters Patent.

Patented Nov. 30, 1920.

Application filed March 26, 1918. Serial No. 224,842.

*To all whom it may concern:*

Be it known that I, IDA E. KNOWLTON, a citizen of the United States, residing at Medina, in the county of Bandera and State of Texas, have invented new and useful Improvements in Cane-Strippers, of which the following is a specification.

The invention has reference to devices for stripping canes and its principal object is to provide a stripper of this character which is made preferably of hard light wood so shaped as to form a handle having two stripping blades extending therefrom, the two blades being in spaced relation, so that they may straddle a stalk to perform the stripping operation thereon.

Another object of the invention is to provide a device of this kind which is simple in construction, durable and effective in operation and which may be manufactured and placed on the market at small cost.

Still other and further objects will appear in the description of the invention which follows.

To the exact embodiment in which it is shown and described, the invention is not to be restricted. The actual reduction to practice may make manifest certain desirable changes and alterations and the right is claimed to any which do not deviate from the scope of the subjoined claim.

Figure 1:
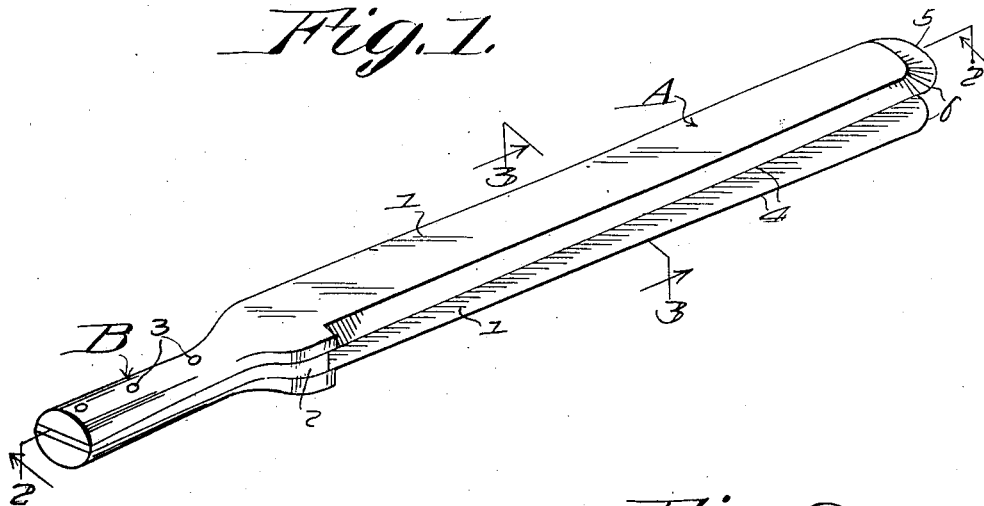
Figure 1 is a perspective view of the cane stripper.
Figure 2:
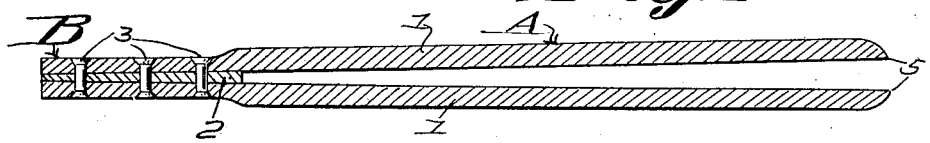
Fig. 2 is a section on the line of 2—2 of Fig. 1.
Figure 3:
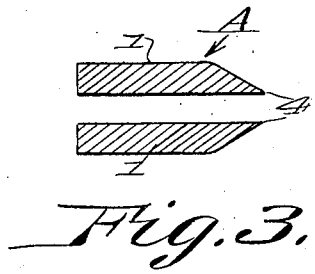
Fig. 3 is a section on the line of 3—3 of Fig. 1.

Referring to the drawings, the stripper is shown as comprising the stripping portion A and the handle portion B. The stripping portion comprises the two blades 1 which are made preferably of some hard wood, such as maple. These blades are integral parts of the handle portion B and are held in spaced relation to each other by a spacing member 2 which is also a part of the handle portion B. The two blades and the spacing member are securely attached together by means of suitable rivets 3 which are fixedly attached in the blades and in the spacing member. The handle portion B therefore consists of the spacing member 2 and the adjacent portion of the blades 1 and, when the three are attached together by the pins 3, the three portions are treated as a single unit and are shaped to the proper conformation to provide a suitable hand grip.

It will be observed that the spacing member 2 is tapering in thickness, having its narrowest portion at the free end of the handle portion B, its thickest portion obtaining at the point where the cutting portion adjoins the handle portion. This particular construction serves to throw the cutting blades into relative diverging position, so that they are separated a greater distance at their free end than at the points of connection with the handle portion.

Each of the cutting blades on the free end and on the outer face, is beveled thus leaving an end cutting edge 4. Similarly longitudinal edges of the cutting blades are beveled on the outer faces, leaving the cutting edges 5. The cutting edges 5 and the cutting edges 4 blend into each other by means of curved cutting edges 6.

The longitudinal edges 7 which are opposite to the cutting edges 5 are formed square with the inner and outer faces of the cutting blades 1.

As is well known, sugar cane stalks taper from the top toward the bottom. Thus the peculiar shape of the improved stripper affords means for making its blades 1 straddle the stalk at the top, the stalk being inserted between the blades until it is near the handle portion B, when the cutting edges 5 will be in a position to engage the stalk on the side. As the stripper is moved down the stalk, it is moved laterally in reference to the stalk, the diverging arrangement of the blades serving to always keep the cutting edges 5 in engagement with the stalk, so that they may remove all offshoots without gouging into the stalk, for as the stripper is moved down the stalk and laterally away from the stalk at the same time, the stalk moves nearer the free ends of the blades whose diverging position provides for the increasing diameter of the stalk.

The usual operation of stripping stalks consists of a downward movement from the upper end toward the bottom of the stalk, there being on the bottom of the stripper a lateral movement in respect to the stalk, whereby the upper and smaller end of the stalk moves from a point adjacent from the handle portion B out toward the end of the stalk, the thicker and bottom portion of the stalk contacting with the blades at their free ends. At the conclusion of the stripping operation, the end cutting edges 4 are brought into contact with the stalk, since there is the tendency on the part of the person performing the stripping operation to move the stripper from a position at right angles to the stalk to a position where the stripper approaches parallel with relation to the stalk, this angular change of position of the stripper with respect to the stalk taking place gradually throughout the stroke of the stripping operation but being more pronounced at the conclusion of the stroke when the end cutting edges 4 are brought into place.

The square cutting edges 7 may be employed to shear off offshoots when the character of the stalk is such that the use of the cutting edges 5 is not advisable.

The stripper being made of wood reduces to a minimum the liability of damage being done to the stalks during the stripping operation and the diverging position of the cutting blades provides for keeping these blades always in contact with the sides of the stalk without cutting into the latter, despite the tapering shape of the stalk.

The invention having been described, what is claimed as new and useful is:

A cane stripper consisting of a handle element and two diverging blades in spaced relation to each other, the blades each having one longitudinal edge beveled to provide a cutting edge beginning at the point of juncture of the blade with the handle, the free extremities of the blades being rounded and also beveled in continuation of the beveled longitudinal edges, whereby the stripping of a stalk may be effected by beginning at the upper end of the stalk and forcing the stripper downward and outward at the same time so that the inner ends of the blades will begin the cutting operation which will be concluded with the outer extremities of the blade.

In testimony whereof I affix my signature.

IDA E. KNOWLTON.